US011593244B2

(12) United States Patent
Berke

(10) Patent No.: US 11,593,244 B2
(45) Date of Patent: Feb. 28, 2023

(54) SYSTEM AND METHOD FOR DETERMINING PHYSICAL ORIENTATION OF A MEMORY MODULE USING ON-BOARD THERMAL SENSORS

(71) Applicant: DELL PRODUCTS, LP, Round Rock, TX (US)

(72) Inventor: Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 488 days.

(21) Appl. No.: 16/797,329

(22) Filed: Feb. 21, 2020

(65) Prior Publication Data
US 2021/0263820 A1 Aug. 26, 2021

(51) Int. Cl.
*G06F 11/30* (2006.01)
*G01K 1/14* (2021.01)

(52) U.S. Cl.
CPC ............ *G06F 11/3058* (2013.01); *G01K 1/14* (2013.01)

(58) Field of Classification Search
CPC .............................. G01K 3/005; G06F 11/3037
See application file for complete search history.

(56) References Cited

U.S. PATENT DOCUMENTS

| | | | | |
|---|---|---|---|---|
| 9,807,911 B1 * | 10/2017 | Bryan | | G06F 1/20 |
| 2004/0260957 A1 * | 12/2004 | Jeddeloh | | G06F 1/3225 |
| | | | | 713/300 |
| 2008/0086282 A1 | 4/2008 | Artman et al. | | |
| 2008/0101051 A1 | 5/2008 | Middleton et al. | | |
| 2014/0098404 A1 * | 4/2014 | Kambegawa | | H04N 1/00954 |
| | | | | 358/1.16 |
| 2014/0304445 A1 * | 10/2014 | Gervasi | | G06F 13/4068 |
| | | | | 710/301 |
| 2014/0371945 A1 * | 12/2014 | Sato | | G05B 15/02 |
| | | | | 700/299 |
| 2015/0105009 A1 * | 4/2015 | Alshinnawi | | H05K 7/2029 |
| | | | | 454/184 |
| 2017/0374760 A1 * | 12/2017 | Chen | | G06F 1/206 |
| 2020/0285298 A1 * | 9/2020 | Basu | | G06F 1/206 |
| 2021/0293438 A1 * | 9/2021 | Matsushita | | F24F 11/89 |

OTHER PUBLICATIONS

"Pluggable Module Thermal Sensors with Power Optimization, Jan. 13, 2010, IBM, https://priorart.ip.com/IPCOM/000191735, pp. 1-4" (Year: 2010).*

* cited by examiner

*Primary Examiner* — Santosh R Poudel
(74) *Attorney, Agent, or Firm* — Larson Newman, LLP

(57) ABSTRACT

An information handling system includes a memory module having a first thermal sensor for a first memory channel, and a second thermal sensor for a second memory channel. A processor receives a first temperature from the first thermal sensor and a second temperature from the second thermal sensor, and performs a first high bandwidth access of the first memory channel. In response to a predetermined amount of time ending, the processor: receives a third temperature from the first thermal sensor and a fourth temperature from the second thermal sensor; determines a first temperature delta based on a difference between the third and first temperatures; and determines a second temperature delta based on a difference between the fourth and second temperatures. Based on the first and second temperature deltas, the processor determines whether the first or second memory channel is an upstream memory channel.

17 Claims, 4 Drawing Sheets

SYSTEM AND METHOD FOR DETERMINING PHYSICAL ORIENTATION OF A MEMORY MODULE USING ON-BOARD THERMAL SENSORS

FIELD OF THE DISCLOSURE

The present disclosure generally relates to information handling systems, and more particularly relates to determining the physical orientation of a memory module using on-board thermal sensors.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements may vary between different applications. Thus information handling systems may also vary regarding what information is handled, how the information is handled, how much information is processed, stored, or communicated, and how quickly and efficiently the information may be processed, stored, or communicated. The variations in information handling systems allow information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, graphics interface systems, data storage systems, networking systems, and mobile communication systems. Information handling systems may also implement various virtualized architectures. Data and voice communications among information handling systems may be via networks that are wired, wireless, or some combination.

SUMMARY

An information handling system includes a memory module and a processor. The memory module includes first and second memory channels, a first thermal sensor located within a middle of the first memory channel, and a second thermal sensor located within a middle of the second memory channel. The processor may receive a first temperature captured by the first thermal sensor, may receive a second temperature captured by the second thermal sensor, and may perform a first high bandwidth access of memory devices within the first memory channel for a predetermined amount of time. In response to the predetermined amount of time ending, the processor may receive a third temperature from the first thermal sensor and a fourth temperature from the second thermal sensor, may determine a first temperature delta based on a difference between the third temperature and the first temperature, and may determine a second temperature delta based on a difference between the fourth temperature and the second temperature. Based on the first and second temperature deltas, the processor may determine whether the first memory channel or the second memory channel is an upstream memory channel.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
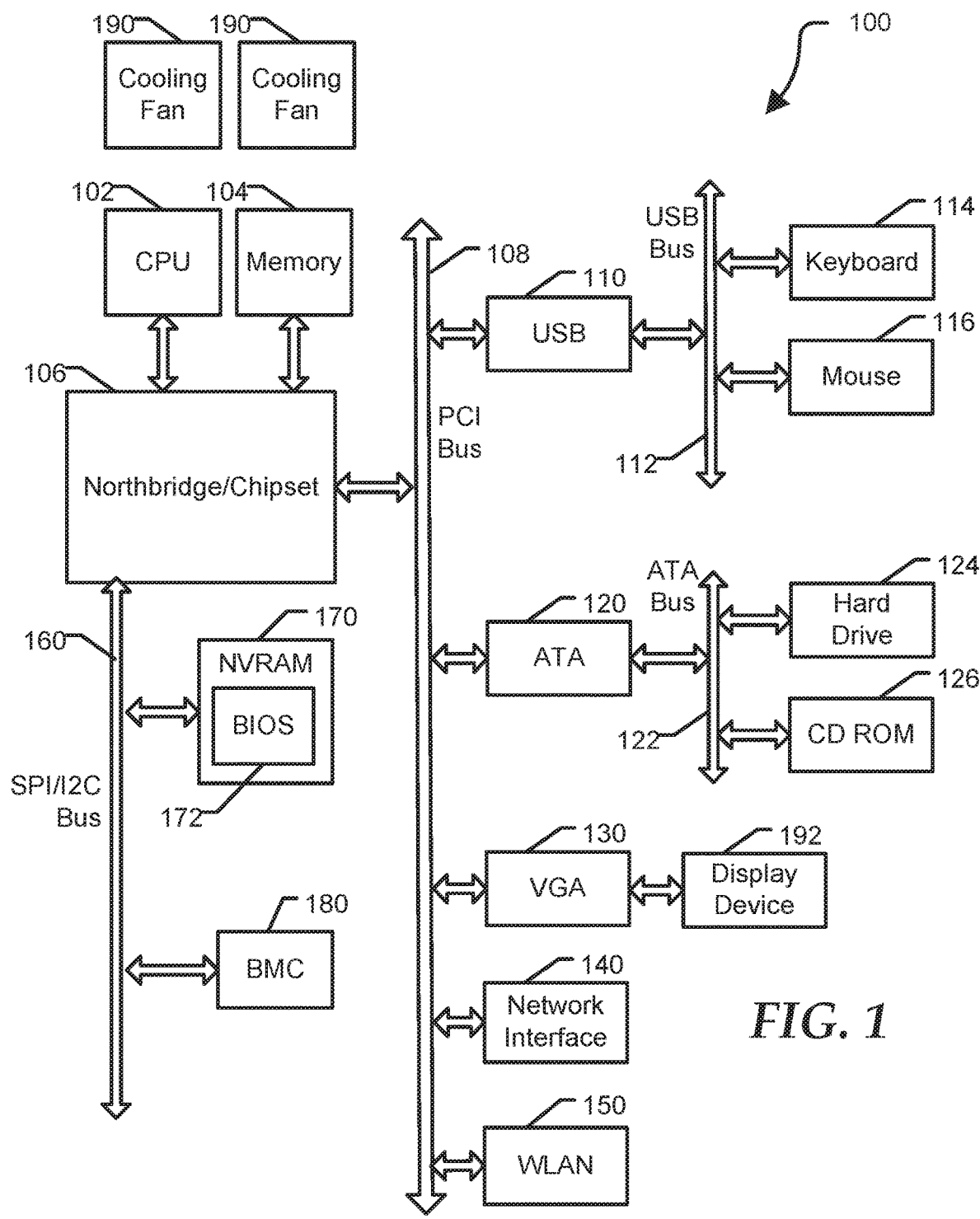
FIG. 1 is a block diagram of a general information handling system according to at least one embodiment of the disclosure.

FIG. 1 illustrates a general information handling system 100 including a processor 102, a memory 104, a northbridge/chipset 106, a PCI bus 108, a universal serial bus (USB) controller 110, a USB bus 112, a keyboard device controller 114, a mouse device controller 116, a configuration an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a NVRAM 170 for storing BIOS 172, a baseboard management controller (BMC) 180, and one or more cooling fans 190. In an embodiment, information handling system 100 may be information handling system 200 of FIG. 2. BMC 180 can be referred to as a service processor or embedded controller (EC). Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor. Cooling fans 190 may provide air flow to the components within information handling 100.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

System 100 can include additional processors that are configured to provide localized or specific control functions, such as a battery management controller. Bus 160 can include one or more busses, including a SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of system 100.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, such as a consistent way for application programs and operating systems to interact with the keyboard, display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

Information handling system 100 can include additional components and additional buses, not shown for clarity. For example, system 100 can include multiple processor cores, audio devices, and the like. While a particular arrangement of bus technologies and interconnections is illustrated for the purpose of example, one of ordinary skilled in the art will appreciate that the techniques disclosed herein are applicable to other system architectures. System 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 192 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media.

Figure 2:
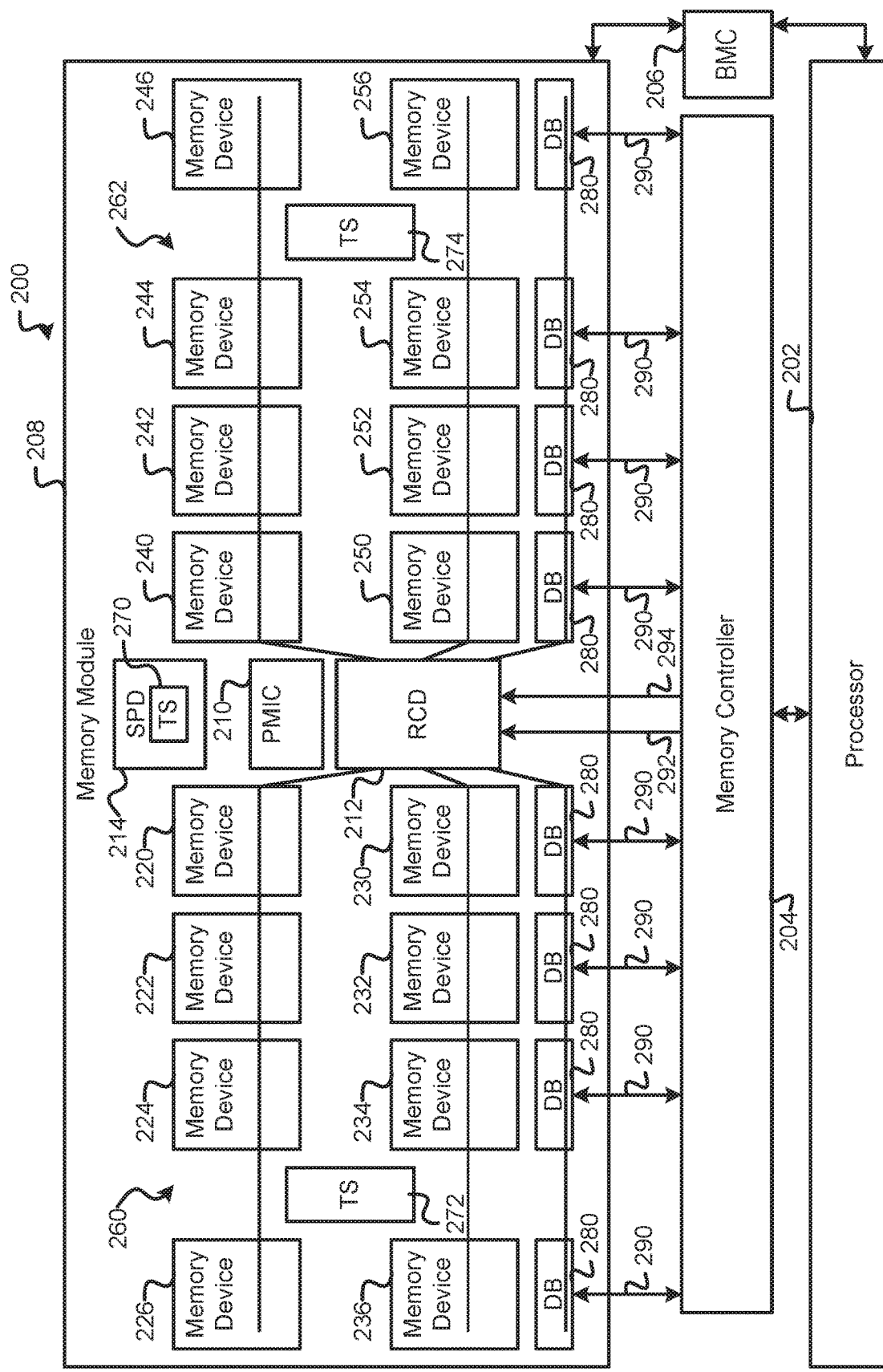
FIG. 2 is a block diagram of a portion of an information handling system according to at least one embodiment of the disclosure.

FIG. 2 illustrates an information handling system 200 including a processor 202, a memory controller 204, a baseboard management controller (BMC) 206, and a memory module 208 according to at least one embodiment of the disclosure. Memory module 208 includes a power management integrated circuit (PMIC) 210, a registering clock driver (RCD) 212, and an electronically erasable programmable read only memory (EEPROM) serial presence detect (SPD) hub 214. Memory module 208 also includes multiple memory devices including, but not limited to, dynamic random access memories (DRAMs) and non-volatile random access memories (NVRAMs), divided into different independent memory channels and memory ranks. For example, memory devices 220, 222, 224, and 226 (220-226) may be assigned or arranged into a first memory rank of a memory channel 260, and memory devices 230, 232, 234, and 236 (230-236) may be assigned or arranged into a second memory rank of the memory channel 260. Similarly, memory devices 240, 242, 244, and 246 (240-246) may be assigned or arranged into a first memory rank of a memory channel 262, and memory devices 250, 252, 254, and 256 (250-256) may be assigned or arranged into a second memory rank of the memory channel 262. Memory devices 220-226, 230-236, 240-246, and 250-256 on memory module 208 may provide data to memory controller 204, via any suitable manner. For example, memory module 208 may include multiple data bus devices 280 that may communicate with memory controller 204, via any suitable bus, such as one of a plurality of SDRAM buses 290, using a known double data rate (DDR), DDR2, DDR3, DDR4, or DDR5 signaling format. In an example, memory controller 204 may provide command signals to RCD 212 via DDR address buses 292 and 294. Thus, communication between memory controller 204 and memory module 208 may be provided via one or more of communication buses 290, 292, and 294.

Memory module 208 includes multiple thermal sensors including, but not limited to, a thermal sensor 270 within SPD hub 214, a thermal sensor 272 located in the middle of memory channel 260, and a thermal sensor 274 located in the middle of memory channel 262. In an example, memory module 208 may include additional thermal sensors without varying from the scope of this disclosure, such as a different thermal sensor in each memory device, 220-226, 230-236, 240-246, and 250-256, and a thermal sensor in PMIC 210. In an example, thermal telemetry data from thermal sensors 270, 272, and 274 may be provided, via any suitable device and/or operation, to an operating system (OS) executed on processor 202 in communication with memory module 208 via memory controller 204. For example, BMC 206 may receive the thermal telemetry data from thermal sensors 270, 272, and 274 via a side-band communication bus, such as I3C communication bus, and the BMC may provide the thermal telemetry data to processor 202. Information handling system 200 may utilize the thermal telemetry data to improve the information handling system by determining a physical orientation of memory module 208 within the information handling system. In an example, the physical orientation may indicate which of memory channels 260 and 262 is an upstream memory channel and which is a downstream memory channel based upon an air flow across memory module 208. In an embodiment, the upstream memory channel is oriented within memory module 208 such that the upstream memory channel is nearest to a cooling fan, such as cooling fan 190 of FIG. 1, within information handling system 200. In an example, air flow across memory module 208 flows across the upstream memory channel and then across the downstream memory channel, such that the memory devices of the downstream memory channel may be heated by the air flow from the memory devices of the upstream memory channel.

Processor 202 may perform one or more operations to perform a physical orientation determination test of memory module 208. For example, processor 202 may cause memory controller 204 to access the memory devices of one or both memory channels 260 and 262, and then the processor may receive and utilize thermal telemetry data from thermal sensors 270, 272, and 274 to determine a physical orientation of memory module 208. In certain examples, these operations may be performed during initialization of memory module 208, during a power-on self test (POST) of information handling system 200, or any other suitable point of operation, such as an 'in situ' operation that does not interrupt a normal state of the information handling system.

In an example, prior to performing the access to the memory devices, processor 202 may receive thermal telemetry data from thermal sensors 270, 272, and 274 via BMC 206, and store initial temperatures for memory channels 260 and 262 as indicated by the thermal telemetry data. Upon storing the initial temperatures for memory channels 260 and 262, processor 202, via memory controller 204, may exercise the memory devices of one of memory channels 260 and 262, such as the memory device of memory channel 260, at a high bandwidth. In an example, the exercising of the memory devices may refer to accessing, via reading data from or writing data to, memory devices 220-226 and 230-236 of memory channel 260 at a high bandwidth, such that the memory devices are rapidly accessed and thereby produce a significant amount of heat. While memory devices 220-226 and 230-236 of memory channel 260 are being accessed at the high bandwidth, memory devices 240-246 and 250-256 of memory channel 262 may be placed in a lowest power state. For example, memory devices 240-246 and 250-256 of memory channel 262 may be placed into a power-down self-refresh state, a clock enable power-down mode, or the like, such that the memory devices produce a minimum amount of heat.

After memory devices 220-226 and 230-236 of memory channel 260 have been accessed at a high bandwidth for a predetermined amount of time, processor 202 may again receive thermal telemetry data from thermal sensors 270, 272, and 274 via BMC 206, and store updated temperatures for memory channels 260 and 262 as indicated by the thermal telemetry data. Processor 202 may store the updated temperatures for memory channels 260 and 262 and then perform one or more operations to calculate temperature deltas for the memory channels. For example, processor 202 may subtract the initial temperature for memory channel 260 from the updated temperature for the memory channel as recorded by thermal sensor 272. Similarly, processor 202 may subtract the initial temperature for memory channel 262 from the updated temperature for the memory channel as recorded by thermal sensor 274.

In an example, processor 202 may utilize, via any suitable manner, these temperature deltas to determine the physical orientation of memory channels 260 and 262 within memory module 208. For example, processor 202 may utilize the polarity of the temperature deltas in any suitable manner to determine the orientation. In an example, if the polarity of the temperature delta for memory channel 260 is positive, such that the temperature of memory devices 220-226 and 230-236 of memory channel 260 increased, and the polarity of the temperature delta for memory channel 262 is negative, such that the temperature of memory devices 240-246 and 250-256 of memory channel 262 decrease, processor 202 may determine that memory channel 262 is the upstream memory channel and memory channel 260 is the downstream memory channel. In this example, the high bandwidth access of memory channel 260 did not heat up memory devices 240-246 and 250-256 of memory channel 262, such that the airflow from cooling fans first traveled across memory devices 240-246 and 250-256 of memory channel 262 and then across memory devices 220-226 and 230-236 of memory channel 260. Additionally, thermal telemetry data from thermal sensor 270, both before and after the high bandwidth access, may be utilized to calculate a temperature delta for the thermal sensor in the middle of memory module 208. In this example, processor 202 may also determine that the temperature delta for thermal sensor 270 is negative, such that the access of memory devices 220-226 and 230-236 of memory channel 260 did not heat up SPD hub 214, which also indicates that memory channel 262 is the upstream memory channel and memory channel 260 is the downstream memory channel.

In another example, if the polarity of the temperature delta for memory channel 260 is positive, such that the temperature of memory devices 220-226 and 230-236 of memory channel 260 increased, and the polarity of the temperature delta for memory channel 262 is also positive, such that the temperature of memory devices 240-246 and 250-256 of memory channel 262 increased, processor 202 may determine that memory channel 260 is the upstream memory channel and memory channel 262 is the downstream memory channel. In this example, the high bandwidth access of memory channel 260 heated up memory devices 240-246 and 250-256 of memory channel 262, such that the airflow from cooling fans first traveled across memory devices 220-226 and 230-236 of memory channel 260 and then across memory devices 240-246 and 250-256 of memory channel 262. Additionally, thermal telemetry data from thermal sensor 270, both before and after the high bandwidth access, may be utilized to calculate a temperature delta for the thermal sensor in the middle of memory module 208. In this example, processor 202 may also determine that the temperature delta for thermal sensor 270 is positive, such that the access of memory devices 220-226 and 230-236 of memory channel 260 heated up SPD hub 214, which also indicates that memory channel 260 is the upstream memory channel and memory channel 262 is the downstream memory channel. Processor 202 may store the orientation, identified upstream and downstream memory channels, of memory module 208 in SPD hub 214.

In an example, processor 202 may utilize a threshold temperature, such as zero or no temperature change, as a comparison to determine the polarity of the temperatures deltas. In this example, if the temperature delta is above the threshold then the polarity of the temperature delta is positive, and if the temperature delta is below the threshold then the polarity of the temperature delta is negative. Thus, if both temperature deltas are above the threshold, then memory channel 260 is the upstream memory channel and memory channel 262 is the downstream memory channel. However, if only the temperature delta for thermal sensor 272 is above the threshold, then memory channel 262 is the upstream memory channel and memory channel 260 is the downstream memory channel.

In certain examples, processor 202 may perform the operations described above while accessing memory devices 240-246 and 250-256 of memory channel 262 at a high bandwidth and placing memory devices 220-226 and 230-236 of memory channel 260 in a lowest power state. In response to this physical orientation test, if the polarity of the temperature delta for memory channel 262 is positive, such that the temperature of memory devices 220-226 and 230-236 of memory channel 260 increased, and the polarity of the temperature delta for memory channel 260 is also positive, such that the temperature of memory devices 240-246 and 250-256 of memory channel 262 increased, processor 202 may verify that memory channel 262 is the upstream memory channel and memory channel 260 is the downstream memory channel. However, if the polarity of the temperature delta for memory channel 260 is negative, such that the temperature of memory devices 220-226 and 230-236 of memory channel 260 decreased, and the polarity of the temperature delta for memory channel 262 is positive, such that the temperature of memory devices 240-246 and 250-256 of memory channel 262 increased, processor 202 may verify that memory channel 260 is the upstream memory channel and memory channel 262 is the downstream memory channel.

In an example, the initial temperature from both thermal sensor 270 and 272 may be substantially equal to a temperature that will either remain the same or increase during the physical orientation test but not decrease. For example, the initial temperatures may be substantially equal to the ambient temperature of information handling system 200. In this example, processor 202 may compare the calculated temperature deltas to a threshold temperature to determine which memory channel is the upstream memory channel and which memory channel is the downstream memory channel. For example, after processor 202 has calculated temperature deltas for memory channels 260 and 262, the processor may compare the temperature deltas to a threshold.

In an example, if the temperature delta for memory channel 260 is greater than the threshold, such that the temperature of memory devices 220-226 and 230-236 of memory channel 260 increased, and the temperature delta for memory channel 262 is less than the threshold, such that the temperature of memory devices 240-246 and 250-256 of memory channel 262 remained substantially the same, processor 202 may determine that memory channel 262 is the upstream memory channel and memory channel 260 is the downstream memory channel. Additionally, thermal telemetry data from thermal sensor 270, both before and after the high bandwidth access, may be utilized to calculate a temperature delta for the thermal sensor in the middle of memory module 208. In this example, processor 202 may also determine that the temperature delta for thermal sensor 270 is less than the threshold, such that the access of memory devices 220-226 and 230-236 of memory channel 260 did not heat up SPD hub 214, which also indicates that memory channel 262 is the upstream memory channel and memory channel 260 is the downstream memory channel.

In another example, if the temperature delta for memory channel 260 is greater than the threshold, such that the temperature of memory devices 220-226 and 230-236 of memory channel 260 increased, and the temperature delta for memory channel 262 is also greater than the threshold, such that the temperature of memory devices 240-246 and 250-256 of memory channel 262 increased, processor 202 may determine that memory channel 260 is the upstream memory channel and memory channel 262 is the downstream memory channel. Additionally, thermal telemetry data from thermal sensor 270, both before and after the high bandwidth access, may be utilized to calculate a temperature delta for the thermal sensor in the middle of memory module 208. In this example, processor 202 may also determine that the temperature delta for thermal sensor 270 is greater than the threshold, such that the access of memory devices 220-226 and 230-236 of memory channel 260 heated up SPD hub 214, which also indicates that memory channel 260 is the upstream memory channel and memory channel 262 is the downstream memory channel.

In an example, this orientation test may be repeated with memory devices 240-246 and 250-256 of memory channel 262 being accessed at the high bandwidth and memory devices 220-226 and 230-236 of memory channel 260 being placed in the lowest power state to verify the physical orientation of memory module 208 as described above. Processor 202 may then store the orientation, such as which memory channel 260 or 262 is upstream, of memory module 208 in SPD hub 214 for later access by one or more components of information handling system 200.

In another example, processor 202 may perform the physical orientation test by accessing the memory devices of both memory channels 260 and 262 at the high bandwidth. In this example, after accessing the memory devices of memory channels 260 and 262 at the high bandwidth for the predetermined amount of time, processor 202 may calculate the temperature delta for thermal sensors 272 and 274. Processor 202 may then determine which temperature delta is the largest, such that the associated memory channel is the downstream memory channel. For example, if the temperature delta for thermal sensor 272 is the largest, then memory channel 260 is the downstream memory channel and memory channel 262 is the upstream memory channel. However, if the temperature delta for thermal sensor 274 is the largest, then memory channel 262 is the downstream memory channel and memory channel 260 is the upstream memory channel. In this example, the testing, or accessing of both memory channels 260 and 262, may be performed simultaneously to minimize test time.

Thus, processor 202 may perform one or more operations to utilize thermal telemetry data from thermal sensors 270, 272, and 274 to determine a physical orientation of memory module 208 and thereby improve information handling system 200.

Figure 3:
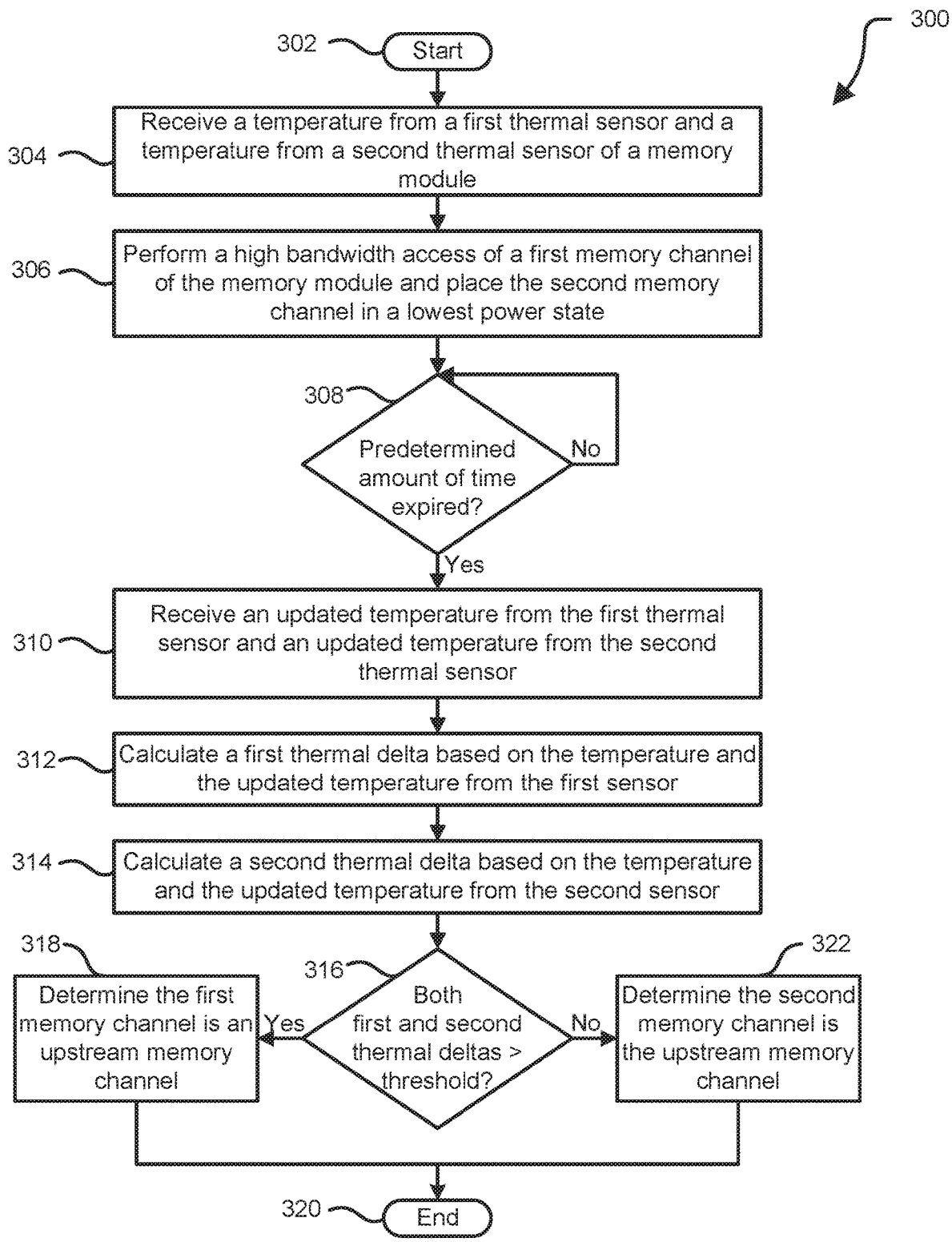
FIG. 3 is a flow diagram illustrating a method for utilizing thermal telemetry data to determine a physical orientation of a memory module according to at least one embodiment of the disclosure.

FIG. 3 shows a method 300 for utilizing thermal telemetry data to determine a physical orientation of a memory module according to at least one embodiment of the disclosure, starting at block 302. It will be readily appreciated that not every method step set forth in this flow diagram is always necessary, and that certain steps of the methods may be combined, performed simultaneously, in a different order, or perhaps omitted, without varying from the scope of the disclosure. FIG. 3 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 3.

At block 304, an initial temperature from a first thermal sensor and an initial temperature from a second thermal sensor are received. In an example, a processor of the information handling system may receive these temperatures, via a BMC, as thermal telemetry data from the first and second thermal sensors of a memory module within the information handling system. In certain examples, the BMC may receive the thermal telemetry data from the thermal sensors via a side-band communication bus, such as I3C communication bus, and may provide the thermal telemetry data to processor.

At block 306, a high bandwidth access of memory devices for a first memory channel is performed and memory devices of a second memory channel are placed in a lowest power state. In an example, these operations may be performed for a predetermined amount of time.

At block 308, a determination is made whether the predetermined amount of time has expired. In response to the predetermined amount of time expiring, an updated temperature is received from the first thermal sensor and an updated temperature is received from the second thermal sensor at block 310.

At block 312, a first temperature delta is calculated based on the initial temperature and the updated temperature from the first thermal sensor. At block 314, a second temperature delta is calculated based on the initial temperature and the updated temperature from the second thermal sensor. In an example, the temperature deltas are calculated by subtracting the initial temperature from the updated temperature.

At block 316, a determination is made whether both the first and second temperature deltas are greater than a threshold. In an example, the threshold is utilized to determine how much, if any, the memory devices of each memory channel are heated up during the high bandwidth access.

If both the first and second temperature deltas are greater than the threshold, the first memory channel is determined to be an upstream memory channel and the second memory channel is determined to be a downstream memory channel at block 318, and the method ends at block 320. Otherwise, if only the first temperature delta is greater than the threshold, the first memory channel is determined to be the downstream memory channel and the second memory channel is determined to be the upstream memory channel at block 322, and the method ends at block 320.

Figure 4:
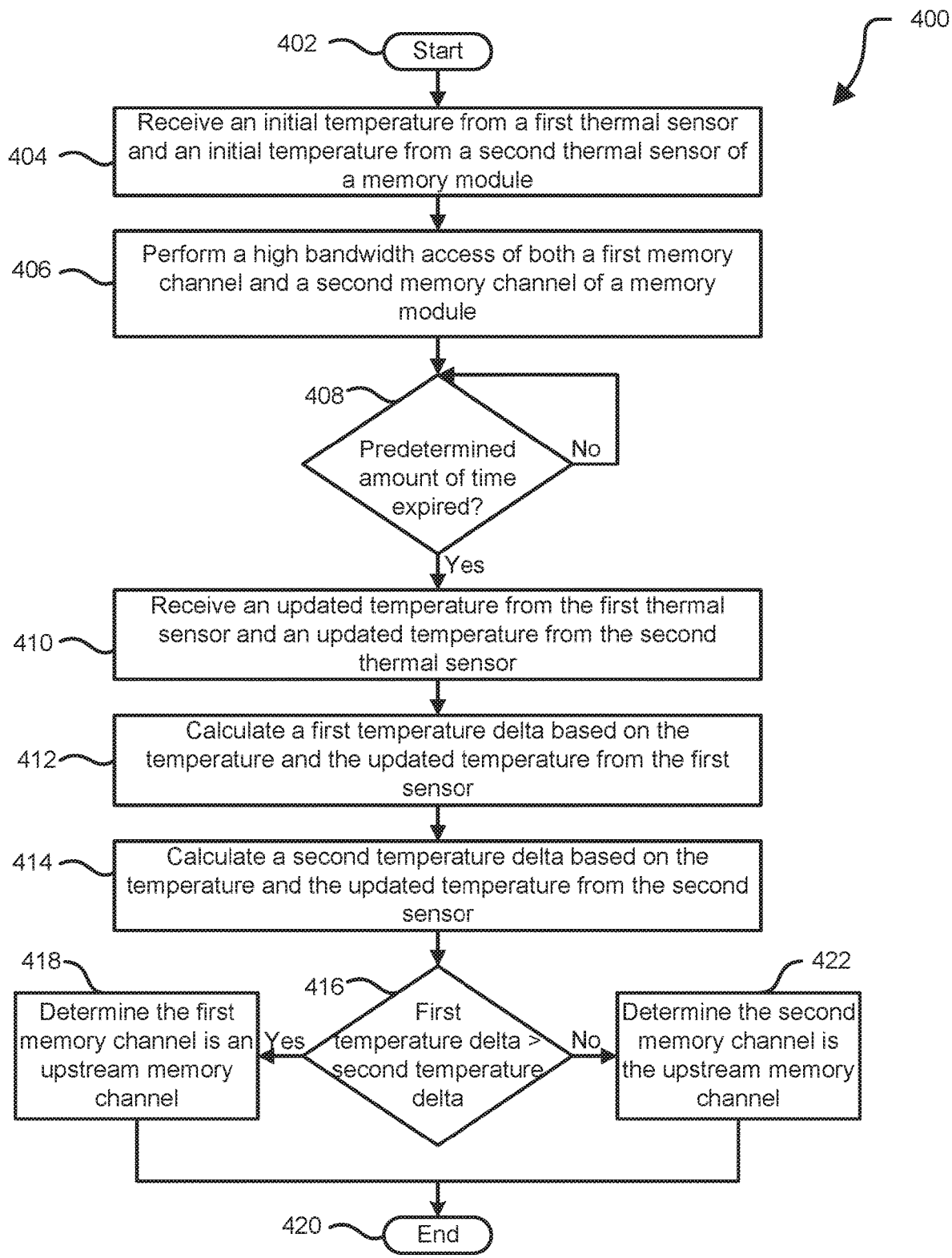
FIG. 4 is a flow diagram illustrating another method for utilizing thermal telemetry data to determine a physical orientation of a memory module according to at least one embodiment of the disclosure.

FIG. 4 is a flow diagram illustrating a method 400 for utilizing thermal telemetry data to determine a physical orientation of a memory module according to at least one embodiment of the disclosure, starting at block 402. It will be readily appreciated that not every method step set forth in this flow diagram is always necessary, and that certain steps of the methods may be combined, performed simultaneously, in a different order, or perhaps omitted, without varying from the scope of the disclosure. FIG. 4 may be employed in whole, or in part, by information handling system 100 depicted in FIG. 1, information handling system 200 described in FIG. 2, or any other type of system, controller, device, module, processor, or any combination thereof, operable to employ all, or portions of, the method of FIG. 4.

At block 404, an initial temperature from a first thermal sensor and an initial temperature from a second thermal sensor are received. In an example, a processor of the information handling system may receive these temperatures, via a BMC, as thermal telemetry data from the first and second thermal sensors of a memory module within the information handling system. In certain examples, the BMC may receive the thermal telemetry data from the thermal sensors via a side-band communication bus, such as I3C communication bus, and may provide the thermal telemetry data to processor.

At block 406, a high bandwidth access of memory devices for both a first memory channel and a second memory channel is performed. In an example, these operations may be performed for a predetermined amount of time.

At block 408, a determination is made whether the predetermined amount of time has expired. In response to the predetermined amount of time expiring, an updated temperature is received from the first thermal sensor and an updated temperature is received from the second thermal sensor at block 410.

At block 412, a first temperature delta is calculated based on the initial temperature and the updated temperature from the first thermal sensor. At block 414, a second temperature delta is calculated based on the initial temperature and the updated temperature from the second thermal sensor. In an example, the temperature deltas are calculated by subtracting the initial temperature from the updated temperature.

At block 416, a determination is made whether the first temperature delta is greater than the second temperature delta. If both the first delta is greater, the first memory channel is determined to be an upstream memory channel and the second memory channel is determined to be a downstream memory channel at block 418, and the method ends at block 420. Otherwise, if the second temperature delta is greater, the first memory channel is determined to be the downstream memory channel and the second memory channel is determined to be the upstream memory channel at block 422, and the method ends at block 420.

In an example, the operations, described above with respect to FIGS. 2, 3, and 4, for utilizing thermal telemetry data to determine a physical orientation of a memory module may be performed in any suitable manner including, but not limited to, performing the operations on multiple memory modules in parallel or one at a time. For example, a processor, such as processor 202, may perform a high bandwidth access of multiple memory modules in parallel to the extent that the heating of any memory module from the high bandwidth access does not impact the testing of another memory module. In this example, the performance of the test on multiple memory modules in parallel may reduce the amount time to determine the physical orientations of all memory modules within an information handling system, such as information handling system 200, as compared to performing the tests serially.

In an example, the testing of multiple memory modules may have a detrimental effect on the memory module tests if the heating of memory devices in one memory module heats up memory devices in another memory device. In this example, processor 202 may not accurately determine upstream and downstream memory channels in a memory module with memory devices heated by the high bandwidth access of memory devices in another memory module. Thus, processor 202 may reduced testing times by performing the operations to determine physical orientations of multiple memory modules in parallel only if the high bandwidth access of one memory module does not affect the testing of another memory module.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module may include software, including firmware embedded at a processor or software capable of operating a relevant environment of the information handling system. The device or module may also include a combination of the foregoing examples of hardware or software. Note that an information handling system may include an integrated circuit or a board-level product having portions thereof that may also be any combination of hardware and software.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising:
   a memory module including:
      a first memory channel including a first plurality of memory devices;
      a first thermal sensor located in a middle of the first memory devices;
      a second memory channel including a second plurality of memory devices;
      a second thermal sensor located in a middle of the second memory devices; and
      a third thermal sensor located in a hub in a middle of the memory module; and
   a processor to communicate with the memory module, the processor to:
      receive a first temperature captured by the first thermal sensor;
      receive a second temperature captured by the second thermal sensor;
      perform a first high bandwidth access of memory devices within the first memory channel for a predetermined amount of time;
      receive a third temperature from the first thermal sensor after the predetermined amount of time;
      receive a fourth temperature from the second thermal sensor after the predetermined amount of time;
      calculate a first temperature delta based on a difference between the third temperature and the first temperature;
      calculate a second temperature delta based on a difference between the fourth temperature and the second temperature;
      determine, based on the first and second temperature deltas, whether the first memory channel or the second memory channel is an upstream memory channel with respect to an air flow across the memory module;

receive fifth and sixth temperatures captured by the third thermal sensor, wherein the fifth temperature is captured by the third thermal sensor prior to the first high bandwidth access of the first memory channel, wherein the sixth temperature is captured by the third thermal sensor in response the predetermined amount of time ending; and calculate a third temperature delta based on a difference between the sixth temperature and the fifth temperature.

2. The information handling system of claim 1, wherein the memory module further includes:

a serial presence detect hub to store information associated with the memory module, the processor to store either the first or second memory channel as the upstream memory channel.

3. The information handling system of claim 1, wherein the determination of whether the first memory channel or the second memory channel is the upstream memory channel further comprises: the processor to determine that the first temperature delta exceeds a threshold value, to determine that the second temperature delta is below the threshold value, and based on the first temperature delta exceeding the threshold value and the second temperature delta being below the threshold value, to determine that the second memory channel is the upstream memory channel.

4. The information handling system of claim 1, wherein the determination of whether the first memory channel or the second memory channel is an upstream memory channel further comprises: the processor to determine that the first temperature delta exceeds a threshold value, to determine that the second temperature delta exceeds the threshold value, and based on both the first and second temperature deltas exceeding the threshold value, to determine that the first memory channel is the upstream memory channel.

5. The information handling system of claim 1, wherein upon the determination of whether the first memory channel or the second memory channel is the upstream memory channel: the processor further to:

perform a second high bandwidth access of memory devices within the second memory channel for the predetermined amount of time;

receive a fifth temperature from the first thermal sensor after the predetermined amount of time;

receive a sixth temperature from the second thermal sensor after the predetermined amount of time;

calculate a third temperature delta based on a difference between the fifth temperature and the first temperature;

calculate a fourth temperature delta based on a difference between the sixth temperature and the second temperature; and verify, based on the first and second temperature deltas, whether the first memory channel or the second memory channel is an upstream memory channel.

6. The information handling system of claim 1, the determination of whether the first memory channel or the second memory channel is the upstream memory channel further comprises: the processor to utilize the third temperature delta along with the first and second temperature deltas to determine whether the first memory channel or the second memory channel is the upstream memory channel.

7. The information handling system of claim 1, the processor further to place memory devices of the second memory channel in a lowest power state during the performance of the first high bandwidth access of the memory devices within the first memory channel for the predetermined amount of time.

8. A method, comprising:

receiving, by a processor, a first temperature captured by a first thermal sensor, the first thermal sensor located in a middle of a first memory channel of a memory module within an information handling system;

receiving, by the processor, a second temperature captured by a second thermal sensor, the second thermal sensor located in a middle of a second memory channel of the memory module within the information handling system;

performing a first high bandwidth access of memory devices within the first memory channel for a predetermined amount of time; and in response to the predetermined amount of time ending:
receiving a third temperature from the first thermal sensor;

receiving a fourth temperature from the second thermal sensor;

calculating a first temperature delta based on a difference between the third temperature and the first temperature;

calculating a second temperature delta based on a difference between the fourth temperature and the second temperature; and based on the first and second temperature deltas, determining whether the first memory channel or the second memory channel is an upstream memory channel with respect to an air flow across the memory module;

receiving fifth and sixth temperatures captured by the third thermal sensor, wherein the fifth temperature is captured by the third thermal sensor prior to the first high bandwidth access of the first memory channel, wherein the sixth temperature is captured by the third thermal sensor in response the predetermined amount of time ending; and calculating a third temperature delta based on a difference between the sixth temperature and the fifth temperature.

9. The method of claim 8, further comprising:

storing, in a serial presence detect hub on the memory module, either the first or second memory channel as the upstream memory channel.

10. The method of claim 8, wherein the determining of whether the first memory channel or the second memory channel is an upstream memory channel further comprises:

determining that the first temperature delta exceeds a threshold value;

determining that the second temperature delta is below the threshold value; and based on the first temperature delta exceeding the threshold value and the second temperature delta being below the threshold value, determining that the second memory channel is the upstream memory channel.

11. The method of claim 8, wherein the determining of whether the first memory channel or the second memory channel is an upstream memory channel further comprises:

determining that the first temperature delta exceeds a threshold value;

determining that the second temperature delta exceeds the threshold value; and based on both the first and second temperature deltas exceeding the threshold value, determining that the first memory channel is the upstream memory channel.

12. The method of claim 8, upon the determining of whether the first memory channel or the second memory channel is the upstream memory channel, the method further comprises:
performing a second high bandwidth access of memory devices within the second memory channel for the predetermined amount of time; and
in response to the predetermined amount of time ending:
receiving a fifth temperature from the first thermal sensor;
receiving a sixth temperature from the second thermal sensor;
calculating a third temperature delta based on a difference between the fifth temperature and the first temperature; and
calculating a fourth temperature delta based on a difference between the sixth temperature and the second temperature; and
based on the first and second temperature deltas, verifying whether the first memory channel or the second memory channel is an upstream memory channel.

13. The method of claim 8, wherein the determining of whether the first memory channel or the second memory channel is the upstream memory channel further comprises:
utilizing the third temperature delta along with the first and second temperature deltas to determine whether the first memory channel or the second memory channel is the upstream memory channel.

14. The method of claim 8, further comprising:
placing memory devices of the second memory channel in a lowest power state during the performing of the first high bandwidth access of the memory devices within the first memory channel for the predetermined amount of time.

15. A method, comprising:
receiving, by a processor, a first temperature captured by a first thermal sensor, the first thermal sensor located in a middle of a first memory channel of a memory module within an information handling system;
receiving, by the processor, a second temperature captured by a second thermal sensor, the second thermal sensor located in a middle of a second memory channel of the memory module within the information handling system;
performing a high bandwidth access of memory devices within the first memory channel and a high bandwidth access of memory devices within the second memory channel for a predetermined amount of time; and
in response to the predetermined amount of time ending:
receiving a third temperature from the first thermal sensor;
receiving a fourth temperature from the second thermal sensor;
calculating a first temperature delta based on a difference between the third temperature and the first temperature; and
calculating a second temperature delta based on a difference between the fourth temperature and the second temperature;
in response to the first temperature delta being greater than the second temperature delta, determining that the second memory channel is an upstream memory channel with respect to an air flow across the memory module;
in response to the second temperature delta being greater than the first temperature delta, determining that the first memory channel is the upstream memory channel;
receiving fifth and sixth temperatures captured by the third thermal sensor, wherein the fifth temperature is captured by the third thermal sensor prior to the first high bandwidth access of the first memory channel, wherein the sixth temperature is captured by the third thermal sensor in response the predetermined amount of time ending; and
calculating a third temperature delta based on a difference between the sixth temperature and the fifth temperature.

16. The information handling system of claim 15, further comprising:
storing, in a serial presence detect hub on the memory module, the determined memory channel as the upstream memory channel.

17. The information handling system of claim 15, further comprising:
utilizing the third temperature delta along with the first and second temperature deltas to determine whether the first memory channel or the second memory channel is the upstream memory channel.

* * * * *